United States Patent Office 3,262,925
Patented July 26, 1966

3,262,925
DISAZO-DYESTUFFS
Willy Mueller and Karl Ronco, Riehen, Switzerland, assignors to Ciba Limited, Basel, Switzerland, a company of Switzerland
No Drawing. Filed June 13, 1963, Ser. No. 287,482
Claims priority, application Switzerland, June 21, 1962, 7,463/62
6 Claims. (Cl. 260—174)

The present invention is based on the observation that valuable carboxylic acid amide azo-dyestuffs are obtained when two molecular proportions of a carboxylic acid halide, which is free from acid groups imparting solubility in water, more especially carboxylic and sulfonic acid groups, and which corresponds to the formula (1)
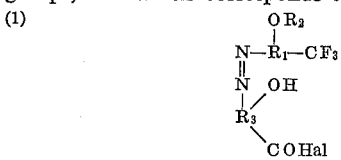

wherein $R_1$ stands for a benzene radical, $R_2$ for an alkyl or cycloalkyl or preferably an aryl radical and $R_3$ for a naphthalene radical in which the azo, hydroxyl and carboxylic acid halide groups are in 1:2:3-position, are condensed with one molecular proportion of an aromatic diamine.

The azo-dyestuff-carboxylic acids on which the acid halides of the Formula 1 are based are obtained by coupling a diazotized amine of the formula (2)

wherein $R_1$ and $R_2$ have the above meanings, with a 2:3-hydroxynaphthoic acid which, if desired, may be substituted in the benzene ring not containing the carboxylic acid group, for example in 6-position, by a halogen atom, more especially bromine, or by an alkoxy group.

From among the amines of the Formula 2 those corresponding to the formula (3)
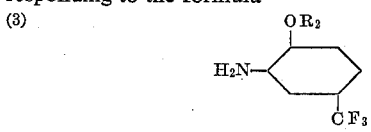

may be specially mentioned; they can be obtained by known methods by reacting 1-trifluoromethyl-3-nitro-4-chlorobenzene with a sodium alcoholate or phenolate and subsequent reduction of the nitro group. As examples of $R_2$ the following may be mentioned: methyl, ethyl, isopropyl, cyclohexyl, phenyl, halogenophenyl (such as 2-chlorophenyl or 4-chlorophenyl, 2:4-dichlorophenyl, 3:4-dichlorophenyl, 2:4:5-trichlorophenyl, 2:3:4:5:6-pentachlorophenyl, 2-bromophenyl, 4-bromophenyl, 4-fluorophenyl), lower alkyl-chlorophenyl alkylphenyl such as 2- or 4-methylphenyl, alkoxyphenyl such as 2-, 3- or 4-methoxyphenyl, α-naphthyl, β-naphthyl and 2- or 4-diphenyl.

The azo-dyestuff-carboxylic acids thus formed are treated with agents capable of converting carboxylic acids into their acid halides, for example the acid chlorides or bromides, more especially with phosphorus halides such as phosphorus pentobromide, trichloride or pentachloride, phosphorus oxyhalides or preferably with thionyl chloride.

The treatment with such acid-halogenating agents is advantageously carried out in an inert organic solvent, such as dimethylformamide, a chlorobenzene such as monochlorobenzene or dichlorobenzene, toluene, xylene or nitrobenzene; the last five mentioned solvents may be used in admixture with dimethylformamide.

In the manufacture of the carboxylic acid halides it is generally advantageous first to dry the azo compounds which have been prepared in an aqueous medium or to free them from water by azeotropic distillation with an organic solvent. If desired, this azeotropic drying may be performed immediately before the treatment with the acid halogenating agent.

According to the present process the monocarboxylic acid halides thus obtained are condensed with aromatic diamines in the molecular ratio of 2:1. It is advantageous to use a diamine of the benzene series, more especially a 1:4-diaminobenzene of the formula (4)
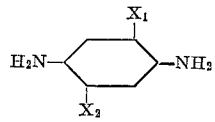

wherein $X_1$ and $X_2$ each stands for a hydrogen or halogen atom or for an alkyl, alkoxy or nitro group. Very good dyestuffs are also obtained with amines of the diphenyl series, more especially those of the formula (5)
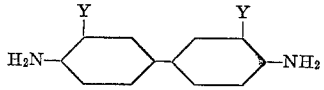

wherein each Y represents a hydrogen or halogen atom or an alkyl or alkoxy group. The following amines may be mentioned by way of example:

1:4-diaminobenzene,
1:3-diaminobenzene,
1:3-diamino-4-methylbenzene
1:3-diamino-4:6-dichlorobenzene,
1:3-diamino-4-chlorobenzene,
1:3-diamino-2:5-dichlorobenzene,
1:4-diamino-2-chlorobenzene,
1:4-diamino-2-bromobenzene,
1:4-diamino-2:5-dichlorobenzene,
1:4-diamino-2-methylbenzene,
1:4-diamino-2:5-dimethylbenzene,
1:4-diamino-2-methoxybenzene,
1:4-diamino-2:5-dimethoxybenzene,
1:4-diamino-2:5-diethoxybenzene,
1:3-diamino-4:6-dimethylbenzene,
1:3-diamino-2:6-dimethylbenzene,
2-chloro-5-methyl-1:4-phenylenediamine,
2-chloro-5-methoxy-1:4-phenylenediamine,
2-methyl-5-methoxy-1:4-phenylenediamine,
4:4'-diaminodiphenyl,
3:3'-dichloro-4:4'-diaminodiphenyl,
3:3'-dimethyl-4:4'-diaminodiphenyl,
3:3'-dimethoxy-4:4'-diaminodiphenyl,
3:3':5:5'-tetrachloro-4:4'-diaminodiphenyl,
2:2':5:5'-tetrachloro-4:4'-diaminodiphenyl,
4:4'-diaminodiphenylketone,
2:8-diaminochrysene,
3:3'-dichloro-5:5'-dimethyl-4:4'-diaminodiphenyl,
4:11-diaminofluoranthene,
2:6- or 1:5-diaminonaphthalene, and
Diaminobenzthiazoles, such as 2 - (4' - aminophenyl)-6-aminobenzthiazole.

The condensation of the carboxylic acid halides described above with the amines is advantageously carried out in an anhydrous medium when it generally proceeds surprisingly easily even at a temperature within the boiling range of the common organic solvents, such as toluene, monochlorobenzene, dichlorobenzene, trichlorobenzene, nitrobenzene or the like. To accelerate the reaction it is in general advisable to work in the presence of an acid-binding agent, such as anhydrous sodium acetate or pyridine. Some of the dyestuffs obtained are, for example, crystalline, whereas others are amorphous, and they are mostly obtained in a very good yield and in the pure state. It is of advantage first to isolate the acid chlorides obtained from the carboxylic acids, although in some cases this may be omitted without causing trouble, the condensation being performed immediately following the manufacture of the carboxylic acid chlorides.

According to a modification of the present process the new dyestuffs are obtained when two molecular proportions of the diazo compound of an amine of the formula

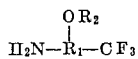

are coupled with one molecular proportion of a compound of the formula (6) 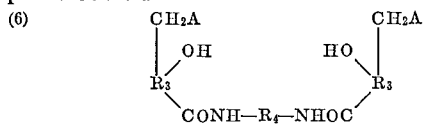

in these formulae $R_1$ stands for a benzene radical, $R_2$ for an alkyl, cycloalkyl or preferably an aryl radical, $R_3$ for a naphthalene radical in which the —$CH_2A$—, hydroxyl and —CONH— groups are in 1:2:3-position, $R_4$ represents an arylene radical and A the radical of an amine, preferably of an amine of the formula (7) 

wherein $R_6$ represents a hydrogen atom or an alkyl radical and $R_7$ an alkyl radical; the radicals $R_6$ and $R_7$ together with the nitrogen atom may also form a heterocycle and may represent for example, the radicals of methylamine, dimethylamine, diethylamine, diethanolamine, pyrrolidine, piperidine or morpholine. The compounds of the Formula 6 can be obtained by reacting the compound of the formula (8) 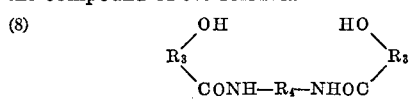

with formaldehyde and a primary or secondary amine.

During the coupling reaction the radical —$CH_2A$— is split off and replaced by the azo group. The coupling is preferably performed in an acid medium.

The new dyestuffs obtained by the present process correspond to the formula

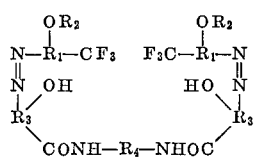

wherein $R_1$ is a benzene radical, $R_2$ stands for an alkyl, cycloalkyl or preferably an aryl radical, $R_3$ for a naphthalene radical in which the azo, hydroxyl and —CONH— groups are in 1:2:3-position, and $R_4$ represents an arylene radical.

The new dyestuffs are valuable pigments and can be used for many different purposes, for example in a finely disperse form for dyeing rayon and viscose, cellulose ethers and esters, polyamides, polyurethanes or polyesters in the spinning solution. They can also be used for the manufacture of colored lacquers or lakes, solutions and products made from acetylcellulose, nitrocellulose, natural resins or synthetic resins, such as polymerization resins or condensation resins, for example aminoplasts, alkyd resins, phenoplasts, polyolefines such as polystyrene, polyvinyl chloride, polyethylene, polypropylene, polyacrylonitrile, gums, casein, silicones and silicone resins. Furthermore, they can be used with advantage in the manufacture of colored pencils, cosmetics and laminated panels.

A special advantage of the pigments manufactured by the present process is that they are obtained in a particularly advantageous physical form so that further conditioning is not necessary.

The following examples illustrate the invention. Unless otherwise indicated, parts and percentages are by weight.

*Example 1*

21.92 parts of 4-isopropoxy-3-amino-1-trifluoromethylbenzene were stirred into 50 parts of 100% acetic acid and 25 parts of concentrated hydrochloric acid and cooled to 10° C. On addition of 50 parts of ice the temperature dropped to —5° C. A solution of 6.9 parts of sodium nitrite in 20 parts of water was then stirred in within 5 minutes, and the whole stirred for 15 minutes at 0 to 2° C. to form a clear, yellow diazo solution. 18.8 parts of 2:3-hydroxynaphthoic acid were dissolved in 400 parts of water at 40 to 45° C. by adding 15 parts of 30% sodium hydroxide solution and the batch was filtered with a small amount of active charcoal. The clear filtrate was made up with water to 600 parts and adjusted to 30° C. Dilute acetic acid was then added dropwise to adjust the pH-value to 6, and 25 parts of crystalline sodium acetate were added. Coupling was then carried out at 30 to 35° C. by slowly introducing the diazo solution below the surface, and by simultaneously adding concentrated sodium hydroxide solution the pH of the reaction mixture was maintained at 5 to 6. Coupling proceeded very rapidly, and on completion of the dropwise addition neither 2:3-hydroxynaphthoic acid nor an excess of diazo compound was detected in the reaction mixture. The batch was stirred for 1 hour at 30 to 35° C., then heated to 70° C., and the mixture rendered strongly acid to Congo red by adding 250 parts of concentrated hydrochloric acid. The mixture was then heated for 15 minutes at 80 to 85° C., filtered, and the dyestuff washed with hot water until the washings ran neutral and were free from salt. It was thoroughly pressed and dried at 90 to 95° C. under 14 mm. Hg pressure. The yield was 41 parts of azo-dyestuff-carboxylic acid, corresponding to 98.2% of the theoretical yield.

41.84 parts of the azo-dyestuff-carboxylic acid were stirred into 200 parts of ortho-dichlorobenzene and heated to 90 to 95° C. In the course of 15 minutes 10 parts of thionyl chloride were dropped in and the mixture heated for 1 hour at 100 to 110° C., during which the dyestuff acid dissolved, accompanied by a strong evolution of hydrochloric acid. The reaction was complete when hydrochloric acid ceased to escape. The batch was then cooled with slow stirring to 20° C., when the acid chloride crystallized in the form of dark-red needles which were filtered, washed with benzene and finally with petroleum ether and dried at 40 to 45° C. under vacuum. Yield: about 38 parts of azo-dyestuff-carboxylic acid chloride of the formula

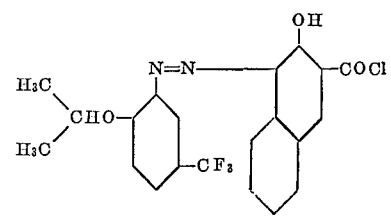

It gave a red solution in most organic solvents. Melting point 220 to 221.5° C.

4.75 parts of this azo-dyestuff-carboxylic acid chloride were stirred into 100 parts of ortho-dichlorobenzene and mixed at 95 to 100° C. with a solution of 0.56 part of para-phenylenediamine in 30 parts of ortho-dichlorobenzene and 0.2 part of pyridine. The batch was stirred for 10 hours at 140 to 145° C. during which the condensation product settled out as a finely crystalline, sparingly soluble precipitate. The reaction mixture was allowed to cool to 95 to 100° C., the hydrochloric acid was neutralized by adding 0.5 part of concentrated ammonia and the whole was filtered. The precipitate was washed with hot ortho-dichlorobenzene until the filtrate ran substantially colourless; the ortho-dichlorobenzene was then removed with methanol and finally the product was washed with hot water to free it from salt. On drying at 100° C. under a pressure of 14 mm. Hg 5 parts of a soft, red pigment dyestuff were obtained which colored synthetic materials, such as polyvinyl chloride, pure red tints having very good properties of fastness to migration and light.

By replacing para-phenylenediamine in the above example by the equivalent amount of 2-chloro-1:4-phenylenediamine, 2:5-dichloro-1:4-phenylenediamine, benzidine or dichlorobenzidine, pigment dyestuffs were obtained which produced similar tints and had equally good fastness properties.

In an analogous manner the azo-dyestuff-carboxylic acids obtained from the diazo components of column I and the coupling components of column II of the following table can be converted into dyestuff carboxylic acid halides which may then be condensed with the diamines listed in column III in the molecular ratio of 2:1. In column IV the tints obtained in polyvinyl chloride films with these pigments are listed.

| | I<br>Diazo component | II<br>Coupling component | III<br>Condensation base | 0.2% dyeing in PVC |
|---|---|---|---|---|
| 1 | 4-methoxy-3-amino-1-trifluoromethyl-benzene. | 2:3-hydroxynaphthoic acid | p-Phenylene-diamine | Bluish red. |
| 2 | ----do---- | ----do---- | 2-chloro-1:4-phenylenediamine | Red. |
| 3 | ----do---- | ----do---- | 2:5-dichloro-1:4-phenylenediamine | Red. |
| 4 | 4-isopropoxy-3-amino-1-trifluoromethylbenzene. | ----do---- | p-Phenylenediamine | Red. |
| 5 | ----do---- | ----do---- | 2:5-dichloro-1:4-phenylenediamine | Yellowish red. |
| 6 | ----do---- | ----do---- | Benzidine | Scarlet. |
| 7 | ----do---- | ----do---- | 3:3'-dichlorobenzidine | Red. |
| 8 | ----do---- | ----do---- | 1:5-diaminoanthraquinone | Scarlet. |
| 9 | ----do---- | ----do---- | 1:5-diamino-3:7-dichloro-anthraquinone. | Red. |
| 10 | 4-phenoxy-3-amino-1-trifluoromethyl-benzene. | ----do---- | p-Phenylenediamine | Orange. |
| 11 | ----do---- | ----do---- | 2-chloro-1:4-phenylenediamine | Red orange. |
| 12 | ----do---- | ----do---- | 2:5-dichloro-1:4-phenylenediamine | Scarlet. |
| 13 | ----do---- | ----do---- | 2:5-dimethyl-1:4-phenylenediamine | Red. |
| 14 | ----do---- | ----do---- | 2-methyl-5-chloro-1:4-phenylenediamine. | Red. |
| 15 | ----do---- | ----do---- | 2-methoxy-5-chloro-1:4-phenylenediamine. | Brownish red. |
| 16 | ----do---- | ----do---- | 2:5-dimethoxy-1:4-phenylenediamine | Bluish red. |
| 17 | ----do---- | ----do---- | 2:5-diethoxy-1:4-phenylenediamine | Do. |
| 18 | ----do---- | ----do---- | Benzidine | Red. |
| 19 | ----do---- | ----do---- | 3:3'-dimethylbenzidine | Bluish. |
| 20 | ----do---- | ----do---- | 3:3'-dichlorobenzidine | Red. |
| 21 | ----do---- | ----do---- | 3:3'-dimethoxybenzidine | Bluish. |
| 22 | 2-amino-4-trifluoromethyl-2'-chloro-diphenyl ether. | ----do---- | p-Phenylenediamine | Red. |
| 23 | ----do---- | ----do---- | 2:5-dichloro-1:4-phenylenediamine | Scarlet. |
| 24 | ----do---- | ----do---- | Benzidine | Yellowish red. |
| 25 | ----do---- | ----do---- | 3:3'-dichlorobenzidine | Red. |
| 26 | ----do---- | ----do---- | 2 chloro-5-methyl-1:4-phenylenediamine. | Bluish red. |
| 27 | ----do---- | ----do---- | 2:5-dimethyl-1:4-phenylenediamine | Do. |
| 28 | 2-amino-4-trifluoromethyl-4'-chlorodiphenyl ether. | ----do---- | Benzidine | Do. |
| 29 | ----do---- | ----do---- | 3:3'-dichlorobenzidine | Red. |
| 30 | ----do---- | ----do---- | p-Phenylene diamine | Orange. |
| 31 | ----do---- | ----do---- | 2:5-dichloro-1:4-phenylene-diamine | Scarlet. |
| 32 | ----do---- | ----do---- | 1:5-naphthylenediamine | Bluish red. |
| 33 | 2-amino-4-trifluoromethyl-2':4'-dichlorodiphenyl ether. | ----do---- | Benzidine | Scarlet. |
| 34 | ----do---- | ----do---- | 3:3'-dichloro benzidine | Yellowish red. |
| 35 | ----do---- | ----do---- | p-Phenylene-diamine | Reddish orange. |
| 36 | ----do---- | ----do---- | 2:5-dichloro-1:4-phenylene-diamine | Red. |
| 37 | 2-amino-4-trifluoromethyl-3':4'-dichloro-diphenyl ether. | ----do---- | p-Phenylene-diamine | Red. |
| 38 | ----do---- | ----do---- | 2:5-dichloro-1:4-phenylene-diamine | Bluish red. |
| 39 | ----do---- | ----do---- | Benzidine | Reddish orange. |
| 40 | ----do---- | ----do---- | 3:3'-dichloro-benzidine | Orange. |
| 41 | 2-amino-4-trifluoromethyl-2':4:5'-trichlorodiphenyl ether. | ----do---- | Benzidine | Scarlet. |
| 42 | ----do---- | ----do---- | 3:3'-dichloro-benzidine | Red. |
| 43 | ----do---- | ----do---- | p-Phenylenediamine | Scarlet. |
| 44 | ----do---- | ----do---- | 2:5-dichloro-1:4-phenylenediamine | Orange. |
| 45 | ----do---- | ----do---- | 1:5-diaminoanthraquinone | Do. |
| 46 | 2-amino-4-trifluoromethyl-2'-methyl-diphenyl ether | ----do---- | p-Phenylene diamine | Yellowish red. |
| 47 | ----do---- | ----do---- | 2:5-dichloro-1:4-phenylenediamine | Do. |
| 48 | ----do---- | ----do---- | 2:5-dimethyl-1:4-phenylenediamine | Red. |
| 49 | ----do---- | ----do---- | 2:4-dichloro-1:5-phenylenediamine | Orange. |
| 50 | ----do---- | ----do---- | Benzidine | Scarlet. |
| 51 | ----do---- | ----do---- | 3:3'-dichloro benzidine | Do. |
| 52 | ----do---- | ----do---- | 2:5:2':5'-tetrachloro benzidine | Yellowish red. |
| 53 | 2-amino-4-trifluoromethyl-diphenyl ether. | ----do---- | p-Phenylene diamine | Orange. |
| 54 | ----do---- | ----do---- | 2:5-dichloro-1:4-phenylene diamine | Scarlet. |
| 55 | ----do---- | ----do---- | Benzidine | Red. |
| 56 | ----do---- | ----do---- | 3:3'-dichlorobenzidine | Red. |
| 57 | 2-amino-4-trifluoromethyl-4'-tertiary butyldiphenyl ether. | ----do---- | p-Phenylenediamine | Scarlet. |
| 58 | ----do---- | ----do---- | 2:5-dichloro-1:4-phenylenediamine | Do. |
| 59 | ----do---- | ----do---- | Benzidine | Yellowish red. |
| 60 | ----do---- | ----do---- | 3:3'-dichlorobenzidine | Red. |
| 61 | 2-amino-4-trifluoromethyldiphenyl ether. | 6-bromo-2-hydroxynaphthalene-3-carboxylic acid. | p-Phenylenediamine | Red. |
| 62 | ----do---- | ----do---- | Benzidine | Bluish red. |
| 63 | ----do---- | ----do---- | 3:3'-dichlorobenzidine | Do. |
| 64 | 2-amino-4-trifluoromethyl-2'-phenyl-diphenyl ether. | 2:3-hydroxynaphthoic acid | p-Phenylenediamine | Red. |
| 65 | 2-amino-4-trifluoromethyl-2'-phenylene ether. | ----do---- | 2:5-dichoro-1:4-phenylenediamine | Yellowish red. |
| 66 | 2-amino-4-trifluoromethyl-3'-methyl-4'-chlorodiphenyl ether. | ----do---- | p-Phenylenediamine | Red. |

Example 2

A solution of 6.4 parts of 1-(4'-chlorophenoxy)-2-amino-4-trifluoromethylbenzene in 50 parts glacial acetic acid was mixed with 6 parts of 30% hydrochloric acid, and diazotized with 5.5 parts of 4 N sodium nitrite solution at 0 to 5° C. After 20 minutes, the batch was diluted with 100 parts of ice water, and the diazo solution run at 0 to 10° C. into a solution of 5.63 parts of 1:4-bis-(1'-dimethylamino-methyl-2'-hydroxy-3' - naphthoylamino)-benzene in 300 parts of water and 20 parts of N hydrochloric acid. The batch was neutralized with sodium acetate solution to pH 4 to 5 and then stirred for 14 hours at 0 to 10° C. It was then suction-filtered, the filter cake was washed with water and suspended in 80 parts of 5 N hydrochloric acid. The whole was stirred for 1 hour at room temperature, filtered, the filter cake rinsed with dilute hydrochloric acid and then with water. The pigment was thoroughly suction-filtered to dryness, covered with 140 parts of pyridine and boiled for 2 hours under reflux with vigorous stirring. It was then filtered while still hot and washed successively with hot pyridine, methanol and water, and dried. It formed a red-brown powder which was very sparingly soluble in organic solvents. When rolled into polyvinyl chloride films it colored them scarlet shades. The coloring was very fast to migration and light. The product obtained as described above had the following structure

Example 3

65 parts of stabilized polyvinyl chloride, 35 parts of dioctyl phthalate and 0.2 part of the dyestuff obtained as described in Example 1 were mixed together and rolled to and from on a two-roll calender for 7 minutes at 140° C. The resulting red film had very good properties of fastness to light and migration.

Example 4

0.25 part of the dyestuff of Example 1, 40 parts of an alkyd-melamine stoving lacquer containing 50% of solids and 4.75 parts of titanium dioxide were ground for 24 hours in a rod mill. An aluminium foil was thinly coated with the resulting lacquer and stoved for 1 hour at 120° C. The red lacquer coating thus produced had good fastness to light.

Example 5

40 parts of nitrocellulose lacquer, 2.375 parts of titanium dioxide and 0.125 part of the dyestuff of Example 1 were ground for 16 hours in a rod mill. An aluminium foil was thinly coated with the lacquer thus obtained. The red lacquer coating on the foil displayed good fastness properties.

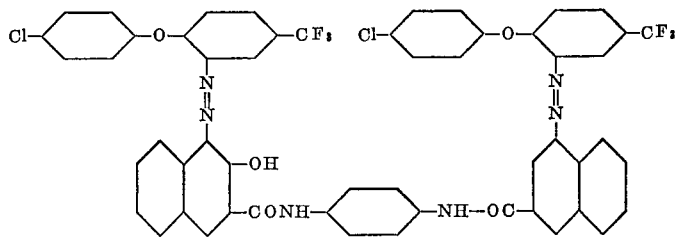

From the components given in the following table further products of similar properties can be obtained by the method described above. Column 1 shows the diazo component, column II the coupling component (used in the form of the Mannich base) and column III the shade produced with the azo pigment in polyvinyl chloride films.

| | I | II | III |
|---|---|---|---|
| 1 | 1-(2'-methylphenoxy)-2-amino-4-trifluoromethylbenzene. | 1:4-bis-(1'-dimethyl-amino-methyl-2'-hydroxy-3'-naphthoylamino)-benzene | Scarlet. |
| 2 | 1-phenoxy-2-amino-4-trifluoromethylbenzene. | ----do---- | Do. |
| 3 | 1-(4'-chlorophenoxy)-2-amino-4-trifluoromethylbenzene. | 4:4'-bis-(1"-dimethyl-aminomethyl-2"-hydroxy-3"-naphthoylamino)-3:3'-dichloro-diphenyl. | Bluish red. |
| 4 | 1-(2'-methylphenoxy)-2-amino-4-trifluoromethylbenzene. | ----do---- | Do. |
| 5 | 1-phenoxy-2-amino-4-trifluoromethylbenzene. | ----do---- | Do. |
| 6 | 1-(4'-chlorophenoxy)-2-amino-4-trifluoromethylbenzene. | 1:4-bis-(1'-dimethyl-aminomethyl-2'-hydroxy-3'-naphthoylamino)-2-trifluoromethylbenzene. | Red-orange. |

What is claimed is:
1. An azo-dyestuff of the formula

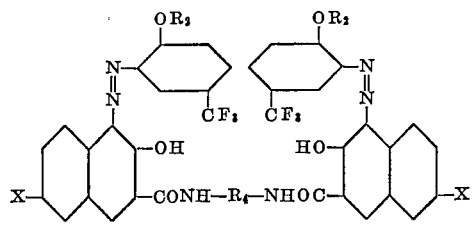

in which X represents a member selected from the group consisting of hydrogen and bromine, $R_2$ a member selected from the group consisting of phenyl, chlorophenyl, dichlorophenyl, lower alkylphenyl, and lower alkyl-chlorophenyl, and $R_4$ a member selected from the group consisting of the radicals of the formulae

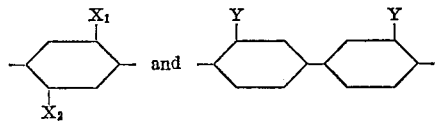

in which $X_1$, $X_2$ and Y each stands for members selected from the group consisting of hydrogen, chlorine, lower alkyl, and lower alkoxy.

2. The dyestuff of the formula
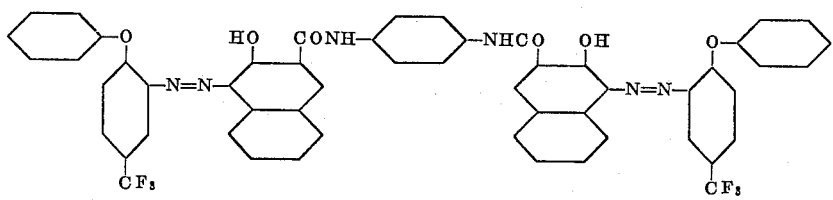
3. The dyestuff of the formula
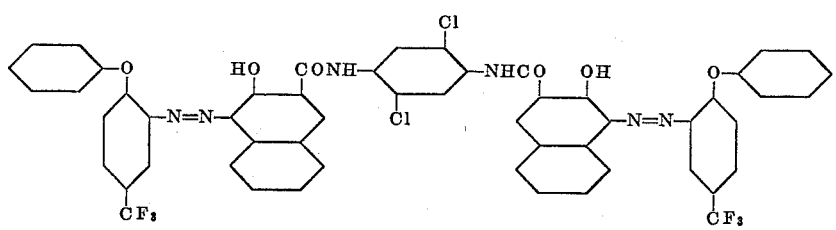
4. The dyestuff of the formula
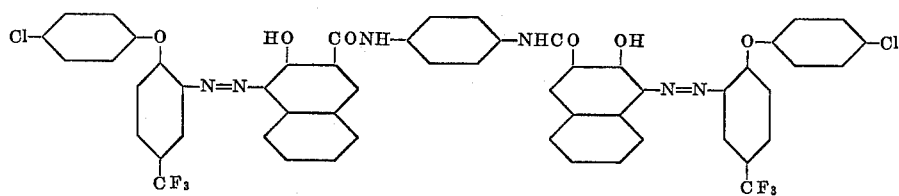
5. The dyestuff of the formula
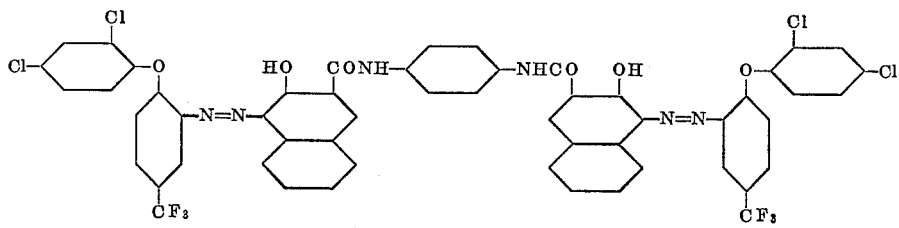
6. The dyestuff of the formula
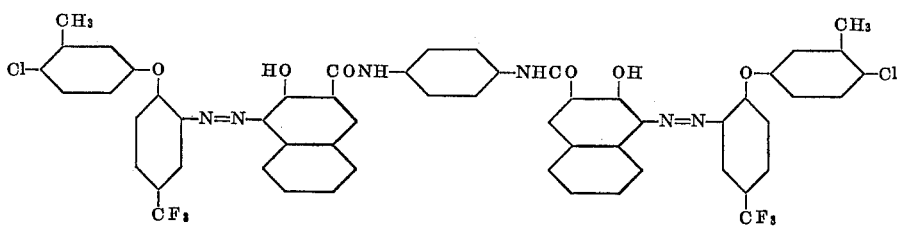
References Cited by the Examiner
UNITED STATES PATENTS
| 1,819,103 | 8/1931 | Laska et al. | 260—184 |
| 2,741,658 | 4/1956 | Schmid et al. | 260—174 |
FOREIGN PATENTS
| 730,384 | 5/1955 | Great Britain. |
CHARLES B. PARKER, *Primary Examiner.*
R. J. FINNEGAN, DONALD M. PAPUGA,
*Assistant Examiners.*